United States Patent
Yamada

(10) Patent No.: US 12,481,645 B2
(45) Date of Patent: Nov. 25, 2025

(54) DATA MANAGEMENT SYSTEM AND METHOD FOR DETECTING BYZANTINE FAULT

(71) Applicant: Scalar, Inc., Tokyo (JP)

(72) Inventor: Hiroyuki Yamada, Kamakura (JP)

(73) Assignee: SCALAR, INC., Tokyo (JP)

( * ) Notice: Subject to any disclaimer, the term of this patent is extended or adjusted under 35 U.S.C. 154(b) by 159 days.

(21) Appl. No.: 18/563,366

(22) PCT Filed: May 24, 2022

(86) PCT No.: PCT/JP2022/021235
§ 371 (c)(1),
(2) Date: Nov. 21, 2023

(87) PCT Pub. No.: WO2022/250047
PCT Pub. Date: Dec. 1, 2022

(65) Prior Publication Data
US 2024/0289324 A1    Aug. 29, 2024

Related U.S. Application Data

(60) Provisional application No. 63/327,586, filed on Apr. 5, 2022, provisional application No. 63/192,211, filed on May 24, 2021.

(51) Int. Cl.
*G06F 16/23* (2019.01)
(52) U.S. Cl.
CPC ............................... *G06F 16/2379* (2019.01)

(58) Field of Classification Search
CPC ............ G06F 16/2379; G06F 16/2365; G06F 16/2343
See application file for complete search history.

(56) References Cited

PUBLICATIONS

Andreas Haeberlen, Petr Kouznetsov, and Peter Druschel. 2007. PeerReview: Practical Accountability for Distributed Systems. In SOSP. 175-188.(https://people.mpi-sws.org/~druschel/publications/peerreview-sosp07.pdf) cited in the original specification.
ISR of PCT/JP2022/021235 dated Aug. 23, 2022 with English translation.
Office Action dated Jul. 19, 2022 directed to the JP counterpart application No. 2022-531632 with a machine translation.

(Continued)

*Primary Examiner* — Charles Rones
*Assistant Examiner* — Xiaoqin Hu
(74) *Attorney, Agent, or Firm* — Procopio, Cory, Hargreaves & Savitch LLP

(57) ABSTRACT

A data management system constituted of first and second computer systems includes a client, and first and second servers which execute a same decision function with respect to identical transaction requests. The first server is provided in the first computer system and the second server is provided in the second computer system. For each transaction request, in an ordering phase, the second server orders a transaction request from the client into a strict serializable partial order, in a commit phase, the first server executes a transaction in accordance with the transaction request from the client in the partial order and returns to the client a first response, and in a validation phase, the second server executes a transaction in accordance with the transaction request from the client in the partial order and returns to the client a second response.

13 Claims, 11 Drawing Sheets

(56) References Cited

PUBLICATIONS

Yamada Hiroyuki, Nemoto Jun Scalar DL: Scalable and Practical Byzantine Fault Detection for Transactional Database Systems Proceedings of the VLDB Endowment [online] Mar. 2022 vol. 15, No. 7 pp. 1324-1336 [retrieved on Jul. 13, 2022], Internet <URL : https://dl.acm.org/doi/abs/10.14778/3523210.3523212> cited in the JP Office Action.

FIG. 3

| Record ID | Version | Lock Type | Lock Count | Lock Holders | Input | Last Updated At |
|---|---|---|---|---|---|---|
| 301 | 302 | 303 | 304 | 305 | 306 | 307 |
| Record ID | Version | Lock Type | Lock Count | Lock Holders | Input | Last Updated At |

FIG. 4

Proof

| Record ID | Version | Nonce (Transaction ID) | Input | Signature |
|---|---|---|---|---|
| 401 | 402 | 403 | 404 | 405 |

DATA MANAGEMENT SYSTEM AND METHOD FOR DETECTING BYZANTINE FAULT

CROSS-REFERENCE TO RELATED APPLICATIONS

This application is U.S. National Stage of International Patent Application No. PCT/JP2022/021235, filed on May 24, 2022, which claims benefit of priority from U.S. Provisional Patent Application No. 63/327,586, filed on Apr. 5, 2022, and U.S. Provisional Patent Application No. 63/192,211, filed on May 24, 2021, the entire contents of which are incorporated herein by reference.

TECHNICAL FIELD

The present invention generally relates to data management and particularly relates to detection of Byzantine faults.

BACKGROUND ART

The following data management system is known.

The data management system includes a plurality of computer systems. Each of the plurality of computer systems stores an object group set. The object group sets in the plurality of computer systems are kept in a same state.

An object group set in a computer system means an object group for each target. An "object group" means one or more objects. An "object" represents a state of a target. A "target" is any tangible entity or intangible entity. For example, a bank account can be adopted as a "target" and a balance on the bank account can be adopted as a "state" of the target.

A computer system executes a transaction in response to a transaction request for reading and/or writing an object.

A computer system may be one or a plurality of nodes and may include a network. While a computer system can be operated by an administrator (for example, an organization or an individual) of the computer system, the computer system cannot be operated by someone (for example, an organization or an individual) other than the administrator of the computer system. For example, while a computer system 1 can be operated by an administrator 1, a computer system 2 cannot be operated by the administrator 1. The computer system 2 can be operated only by an administrator 2.

Methods of detecting a Byzantine fault in a data management system include a method "PeerReview" disclosed in NPL 1. PeerReview runs on a peer-to-peer basis. In addition, in PeerReview, a computer system is a single node. With respect to PeerReview, for the sake of convenience, a node of which a record is to be created first will be referred to as a "primary node" and nodes other than a primary node will be referred to as "secondary nodes".

PeerReview creates a total-order hash-chained execution log in a primary node and makes each of one or more secondary nodes replay the log sequentially in order to compute same states and results of the primary node.

CITATION LIST

Non Patent Literature

[NPL 1] Andreas Haeberlen, Petr Kouznetsov, and Peter Druschel. 2007. PeerReview: Practical Accountability for Distributed Systems. In SOSP. 175-188. (https://people.mpi-sws.org/~druschel/publications/peerreview-sosp07.pdf)

SUMMARY OF INVENTION

Technical Problem

The detection of Byzantine faults in the data management system described above is desirably realized while guaranteeing strict serializability and enabling transactions to be executed in parallel. However, in PeerReview, since a secondary node has to sequentially replay the total-order hash-chained execution log created by a primary node, overall parallelism of transaction execution is limited.

Solution to Problem

A data management system which comprises first and second computer systems includes: a client which transmits a transaction request, which is a request for a transaction to read and/or write an object representing a state of a target; and first and second servers which execute a same decision function with respect to identical transaction requests.

The first computer system manages a first object group set. The first object group set is a first object group for each target. The first object group is one or more first objects. The first object represents a state of a target.

The second computer system manages a second object group set. The second object group set is a second object group for each target. The second object group is one or more second objects. The second object represents a state of a target.

The first server is provided in the first computer system. In an execution of a transaction by the first server, the first object is read from the first object group set and/or the first object is written to the first object group set.

The second server is provided in the second computer system. In an execution of a transaction by the second server, the second object is read from the second object group set and/or the second object is written to the second object group set.

There are an ordering phase, a commit phase, and a validation phase. For each transaction request, in the ordering phase, the client transmits to the second server the transaction request and the second server orders the transaction request from the client into a strict serializable partial order, in the commit phase, the client transmits to the first server the transaction request and the first server executes a transaction in accordance with the transaction request from the client in the partial order determined in the ordering phase and returns to the client a first response to the transaction request, and in the validation phase, the second server executes a transaction in accordance with the transaction request from the client in the partial order determined in the ordering phase and returns to the client a second response to the transaction request, and the client detects a Byzantine fault, based on a result of a comparison between the second response and the first response.

Advantageous Effects of Invention

A detection of Byzantine faults in a data management system can be realized while guaranteeing strict serializability and enabling transactions to be executed in parallel.

BRIEF DESCRIPTION OF DRAWINGS

FIG. 3 shows an example of a configuration of a lock table.

FIG. 4 shows an example of a configuration of a proof.

DESCRIPTION OF EMBODIMENTS

Figure 1:
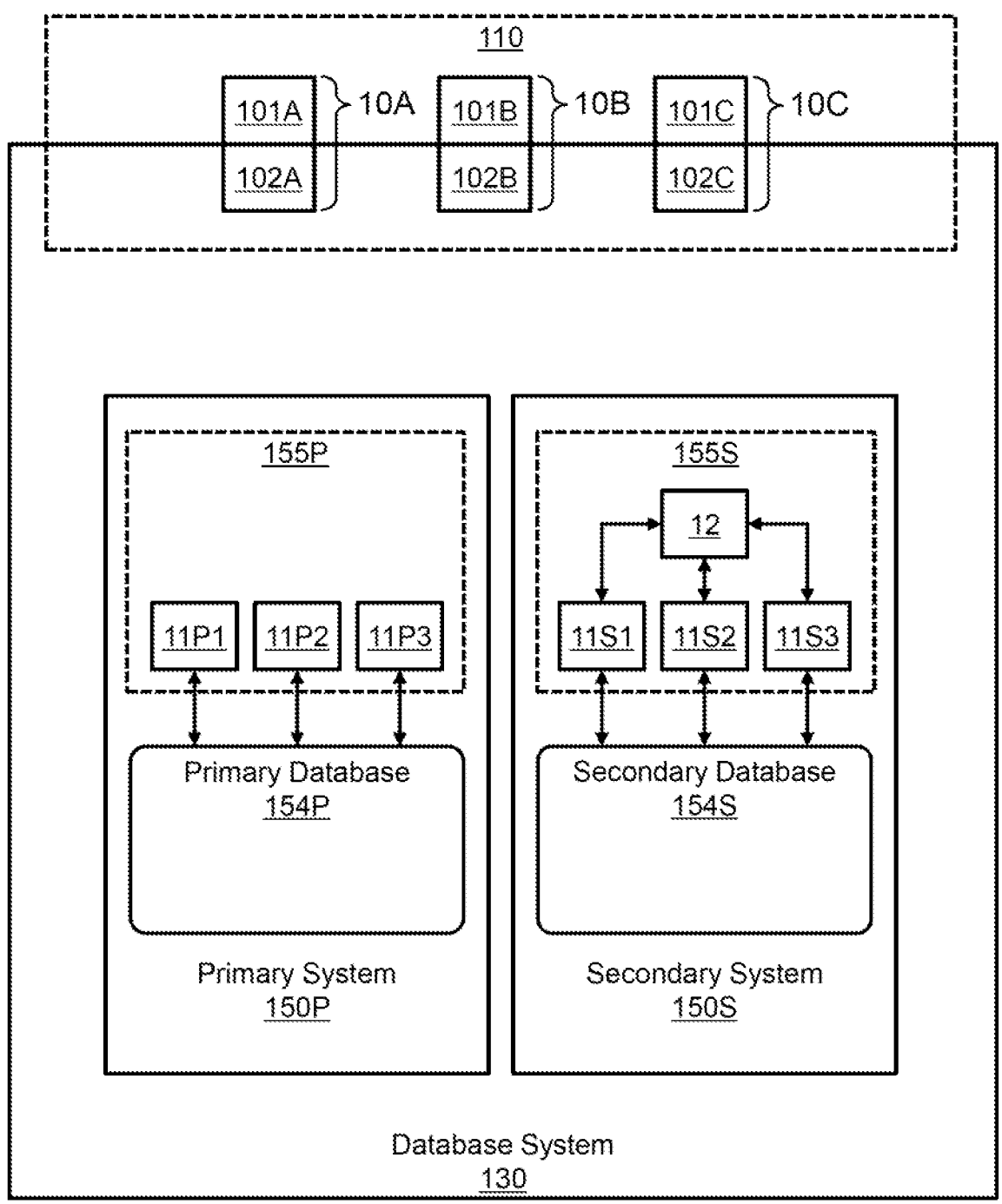
FIG. 1 shows an example of a configuration of a database system according to an embodiment.

In the following description, an "interface apparatus" includes one or more interfaces. The one or more interfaces may be one or more communication interface devices of a same kind (for example, one or more NICs (Network Interface Cards)) or two or more communication interface devices of different kinds (for example, an NIC and an HBA (Host Bus Adapter)).

In addition, in the following description, a "storage apparatus" includes one or more memories. At least one memory of the storage apparatus may be a volatile memory. The storage apparatus is mainly used during processing by a processor. In addition to memories, the storage apparatus may include one or more non-volatile storage devices (for example, an HDD (Hard Disk Drive) or an SSD (Solid State Drive)).

Furthermore, in the following description, a "processor" includes one or more processors. At least one processor is typically a microprocessor such as a CPU (Central Processing Unit). Each of the one or more processors may be single-core or multi-core. The processor may include a hardware circuit which performs a part of or all of processing.

In addition, in the following description, while processing may be described using a "program" as a subject, since the program performs prescribed processing using the storage apparatus (for example, a memory) and/or an interface apparatus (for example, a communication port) and the like as appropriate by being executed by the processor, the processor may be considered a subject of the processing. Processing described using the program as a subject may be considered processing performed by the processor or by an apparatus including the processor. Furthermore, the processor may include a hardware circuit (for example, an FPGA (Field-Programmable Gate Array) or an ASIC (Application Specific Integrated Circuit)) which performs a part of or all of the processing. The program may be installed onto an apparatus such as a computer from a program source. For example, the program source may be a program distribution server or a computer-readable recording medium (for example, a non-transitory recording medium). In addition, in the following description, two or more programs may be realized as one program or one program may be realized as two or more programs.

Furthermore, in the following description, while a function may be described using expressions such as a "yyy unit", a function may be realized when one or more computer programs are executed by a processor, may be realized by one or more hardware circuits (for example, an FPGA or an ASIC), or may be realized by a combination thereof. In a case where a function is realized when a program is executed by a processor, since prescribed processing is performed while using a storage apparatus and/or an interface apparatus or the like as appropriate, the function may be considered a part of the processor. Processing described using a function as a subject may be considered processing performed by a processor or an apparatus including the processor.

In addition, in the following description, common signs among reference signs may be used when describing elements of a same kind without distinction but reference signs may be used when distinguishing elements of a same kind from one another.

Furthermore, in the following description, a "record" refers to a block of logical electronic data as viewed from a program such as an application program and is, specifically, an example of an object which represents a state of a target. For example, data as a record is a key-value pair or a tuple.

In addition, in the following embodiment, a "Byzantine fault" may be any fault and may include malicious internal attacks such as tampers.

FIG. 1 shows an example of a configuration of a database system according to an embodiment.

A database system 130 includes two computer systems 150. The database system 130 is an example of a data management system.

Each of the two computer systems 150 includes a database 154. The databases 154 of the two computer systems 150 are kept in a same state.

The two computer systems 150 are a primary system 150P and a secondary system 150S. The primary system 150P is an example of the first computer system. The secondary system 150S is an example of the second computer system. The primary system 150P is a computer system which commits first. The secondary system 150S is a computer system other than the primary system 150P.

The primary system 150P includes a primary database 154P and a primary server 155P. The primary server 155P is a database server which includes one or a plurality of primary server units 11P (for example, 11P1 to 11P3). The primary server unit 11P performs input and output of data with respect to the primary database 154P. The primary database 154P is an example of the first object group set and the primary server 155P is an example of the first server. The primary database 154P may be a distributed database constituted of a plurality of replicas. The primary system 150P may be a primary database system and the primary server 155P may be present outside of the primary system 150P.

In a similar manner, the secondary system 150S includes a secondary database 154S and a secondary server 155S. The secondary server 155S includes one or a plurality of secondary server units 11S (for example, 11S1 to 11S3). The secondary server unit 11S performs input and output of data with respect to the secondary database 154S. The secondary database 154S is an example of the second object group set and the secondary server 155S is an example of the second server. The secondary database 154S may also be a distributed database constituted of a plurality of replicas. The secondary system 150S may be a secondary database system and the secondary server 155S may be present outside of the secondary system 150S.

The database 154 may include records of all versions for each target. Alternatively, for each target, records of previous versions may be managed separately from the database 154 and the records of previous versions may be present either inside or outside of the computer system 150.

Furthermore, in the database 154, a record may include an ID (for example, nonce) of a transaction including a write of the record, an input for generating the record (a set of IDs and versions of all records having been read in order to generate the record), and a MAC or data such as transaction IDs, an input, and a MAC may be present at a location other than the database 154 in association with the record. A MAC is an example of authentication data. Instead of a MAC, authentication data may be other types of data such as an electronic signature which is used for authentication (a receiver arriving at a conviction that received data has been sent from a sender of the data).

The secondary server 155S manages a lock table 12. The lock table 12 may be common to the plurality of secondary server units 11S or each secondary server unit 11S may store the lock table 12, and when one secondary server unit 11S updates the lock table 12, the update may be reflected onto the lock tables 12 of the other secondary server units 11S. In addition, each secondary server unit 11S may include a portion of the lock table 12 (for example, the first secondary server unit 11S1 may include a first portion of the lock table 12 and the second server unit 11S2 may include a second portion of the lock table 12) and the entirety of the plurality of secondary server units 11S may include one lock table 12.

A client system 110 of the database system 130 includes one or a plurality of client computers 10 (for example, 10A to 10C). The client computer 10 is a physical or a virtual computer. The client computer 10 may include an application 101 and a database client 102.

The database system 130 according to the present embodiment includes the database client 102 and a database server 155. The database server 155 may be configured as a computer system including the database 154.

The database system 130 executes non-conflicting transactions in parallel. The database system 130 detects Byzantine faults in the computer system 150.

The database client 102 provides a single view of the database system 130 with respect to the application 101. The database 154 may be a single-node database or a multi-node distributed database.

The database servers 155P (database server units 11P1 to 11P3) and 155S (database server units 11S1 to 11S3) have a same set of decision functions. The database client 102 issues a transaction request including a reference to a function to be executed and all parameters considered necessary with respect to the function.

The database system 130 supports read operations and write operations.

Both databases 154 need not necessarily provide ACID (Atomicity, Consistency, Isolation, and Durability) with strict serializability in Isolation. For example, the primary database 154P may provide ACID in read committed Isolation and the secondary database 154S may provide Durability and Linearizability in a single operation with respect to a single record. Both databases 154 are constituted of a set of records and, in each set of records, a primary key identifies each record.

The present embodiment adopts the following.

When two computer systems 150 are honest and a same request is input to the two computer systems 150, since the two computer systems 150 include a same set of decision functions, a same result is rendered.

When one computer system 150 has a Byzantine fault but the other computer system 150 is honest, safety is provided and the Byzantine fault can be detected.

When both of the two computer systems 150 have Byzantine faults, there is a possibility that the Byzantine fault in each of the computer systems 150 cannot be detected.

Neither of the two computer systems 150 has privileged abilities. In other words, the database system 130 is a decentralized system. In addition, in order to keep the databases 154 of the two computer systems 150 in a same state, the two computer systems 150 make an agreement to perform processing such as transactions and recoveries. In other words, each computer system 150 cannot run a transaction or a recovery without an agreement by the other computer system 150.

The database 154 may include a record group for each target. For each target, the record group may be one or more records. One primary key (record ID) may correspond to one target. While records of all versions are present in the database 154 with respect to one primary key (one target) in the present embodiment, records of previous versions may be managed outside of the database 154 or records of some versions may not be subjected to management.

The database system 130 manages two types of secret data for a MAC (Message Authentication Code). One of the types of secret data is secret data (hereinafter, $secret_{ClientServer}$) that is shared between the client 102 and the server 155. The other type of secret data is secret data (hereinafter, $secret_{PrimarySecondary}$) that is shared between the primary server 155P and the secondary server 155S.

Figure 2:
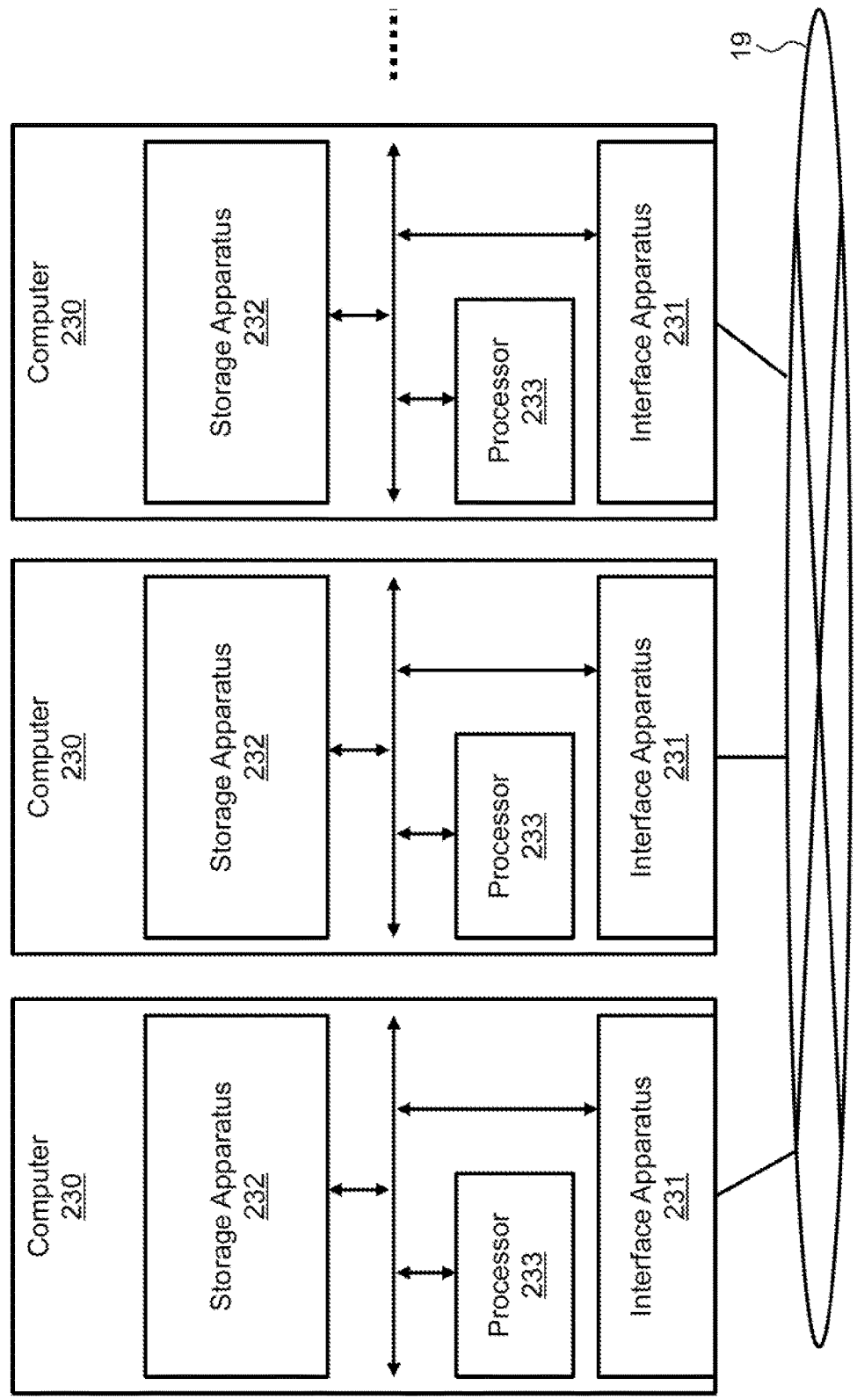
FIG. 2 shows an example of a hardware configuration.

A physical computer system to form a basis of the database system 130 may be a system illustrated in FIG. 2. In other words, the physical computer system may be constituted of one or a plurality of computers 230 coupled to a communication network 19. The computer 230 may include an interface apparatus 231 to be coupled to the communication network 19, a storage apparatus 232 which stores a part of or all of the database 154 and computer programs, and a processor 233 coupled to the apparatuses 231 and 232. The database server unit 11 or the database server 155 may be realized when the processor 233 executes a server program. The one or more computers 230 may store the database 154 and realize the database server 155, and one computer system 150 may include the database 154 and the database server 155.

The client system 110 may be a system based on a physical computer system including at least one computer. Each of the one or a plurality of computers may be a client computer. A processor of one or a plurality of client computers may execute an application program or a client program, the application 101 may be realized by executing the application program, and the database client 102 may be realized by executing the client program. The application 101 and the database client 102 may be present in a same client computer or may be present in separate client computers.

FIG. 3 shows a configuration of the lock table 12.

The lock table 12 has a lock entry 300 for each primary key of the secondary database 154S. In other words, there is one lock entry 300 for each primary key. The lock entry 300 includes data such as a record ID 301, a version 302, a lock type 303, a lock count 304, a lock holder 305, an input 306, and a latest update time 307. One lock entry 300 will be described as an example. In addition, in the description of FIG. 3, a record corresponding to the record ID 301 and the version 302 of the lock entry 300 will be referred to as a "corresponding record".

The record ID 301 represents an ID of the corresponding record among the secondary database 154S. The version 302 represents a version of the corresponding record. For example, the version is a number which is incremented when the corresponding record is committed.

The lock type 303 represents a type of a lock. The lock type 303 includes a "read lock", a "write lock", and "no lock". A "read lock" means a lock acquired for a read. A "write lock" means a lock acquired for a write. "No lock" means that a lock has not been acquired.

The lock count 304 represents the number of transactions having acquired the lock of the corresponding record. With respect to a write lock, the number of transactions is 1. With respect to a read lock, the number of transactions is 1 or more. The lock holder 305 is a set of transaction IDs (nonce) of transactions having acquired a write lock or a read lock.

The input 306 is data stored when a write lock is acquired and is a set of IDs and versions of all records having been read in order to generate a record of a subsequent version with respect to a record ID for which a write lock has been acquired. For example, when a record (record ID "k1" and version "2") and a record (record ID "k2" and version "3") have been read in order to generate a record of a version subsequent to a corresponding record, the input 306 of the corresponding record is a set of the record ID "k1" and the version "2" and the record ID "k2" and the version "3".

The latest update time 307 represents the latest time of day (date and time) at which the lock entry 300 has been updated.

FIG. 4 shows an example of a configuration of a proof.

As will be described later, in the present embodiment, for each record to be written or read, a proof of the record (a proof of a read or write of the record) is created. The proof includes data such as a record ID 401, a version 402, a nonce (transaction ID) 403, an input 404, and a signature 405. In the description of FIG. 4, a record corresponding to the proof illustrated in FIG. 4 will be referred to as a "corresponding record".

The record ID 401 represents an ID of the corresponding record. The version 402 represents a version of the corresponding record.

The nonce (transaction ID) 403 represents a nonce (ID) of a transaction for reading or writing the corresponding record. The input 404 is a set of IDs and versions of records having been read in order to generate the corresponding record.

The signature 405 is a MAC created using the $secret_{PrimarySecondary}$ and is a MAC with respect to pieces of data 401 to 404.

An important point of a Byzantine fault detection protocol of the database system 130 is that the primary server 155P and the secondary server 155S make an agreement on the partial ordering of transactions in a decentralized and concurrent way. The protocol is constituted of three phases, namely, the ordering phase, the commit phase, and the validation phase. First, the secondary server 155S orders a transaction given from the client 102 in a partial order based on conflicts (the ordering phase). Next, the primary server 155P executes and commits a transaction ordered by the secondary server 155S (the commit phase). Finally, the secondary server 155S validates the ordering result given from the primary server 155P and executes the transaction (the validation phase). The 3-phase protocol enables databases 154 of both computer systems 150 to derive a same correct (strict serializable) state and a result as long as both computer systems 150 are honest. When a Byzantine fault occurs in either of the computer systems 150, the states or results of the computer systems 150 will be diverged. The client 102 is capable of detecting such a divergence and detecting Byzantine faults in the database system 130. Hereinafter, each phase will be described in detail. Note that in the following description, "set an error to a response" means to set data representing an error to a response. "Set a result to a response" means to set data representing a result of a transaction execution to a response. For example, data representing a result includes data representing a success or failure of a transaction execution and data representing a state obtained by execution of a decision function (for example, a state represented by a read record or a state calculated using a plurality of states represented by a plurality of read records).

Figure 5:
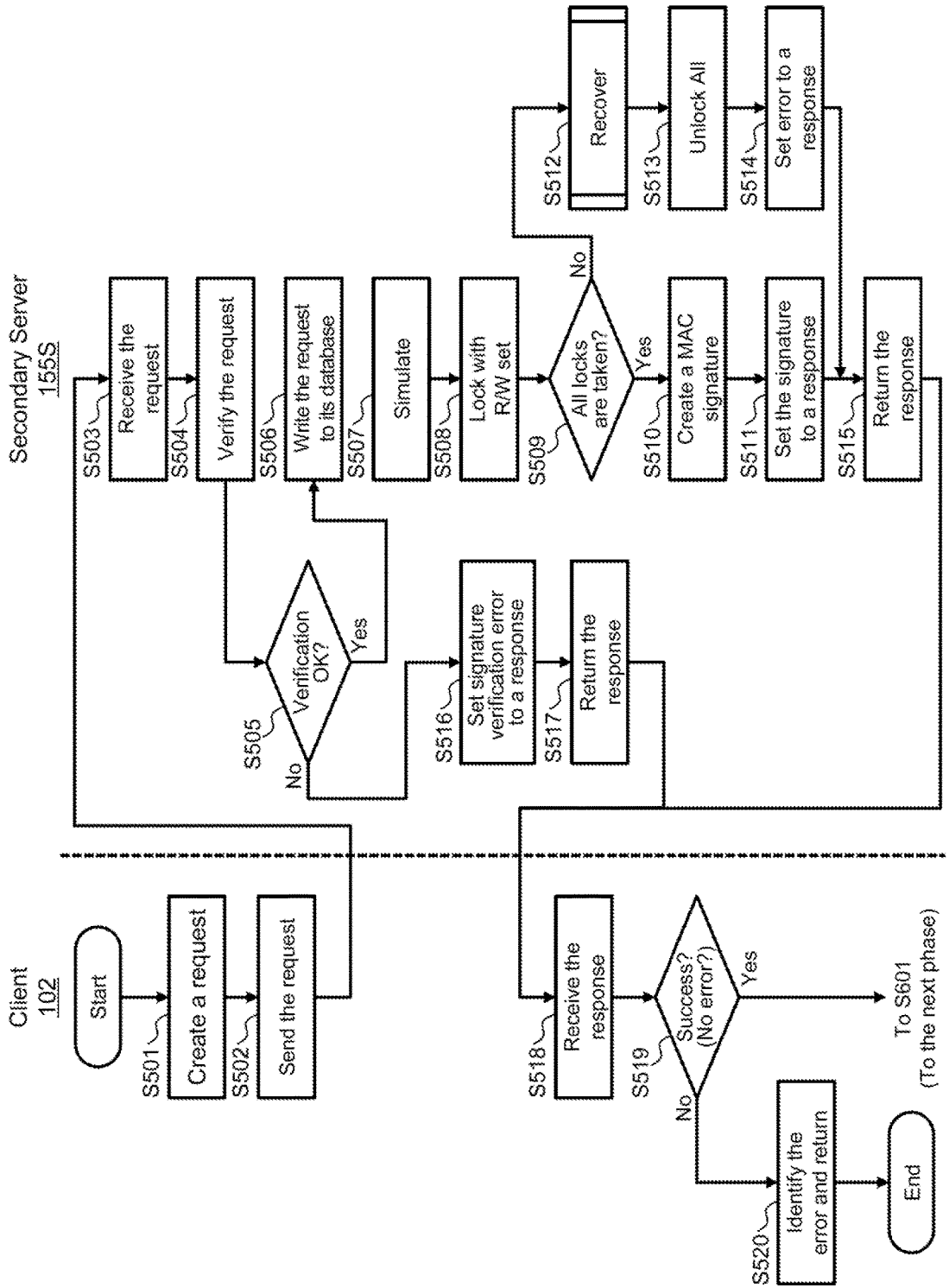
FIG. 5 shows an example of a flow of processing in an ordering phase.

FIG. 5 shows an example of a flow of processing in the ordering phase.

The ordering phase starts when the client 102 receives a transaction request for an execution of a function with respect to the database system 130 from the application 101. Based on the transaction request from the application 101, the client 102 creates an internal transaction request (S501). The transaction request includes parameters <n, f, a, s>. The parameters are as follows.

The parameter n is a unique transaction ID that identifies the request (for example, nonce (or an UUID)).

The parameter f is a reference to the function.

The parameter a is an argument of the function.

The parameter s is a MAC (hereinafter, a $MAC_{client}$) created with respect to n, f, and a using the $secret_{ClientServer}$.

The client 102 transmits the created transaction request to the secondary server 155S (S502).

The secondary server 155S receives the transaction request (S503) and verifies the $MAC_{client}$ of the transaction request using the $secret_{ClientServer}$ (S504). When an error is detected in S504 (S505: No), the secondary server 155S sets a MAC verification error to a response (S516) and returns the response to the client 102 (S517).

Note that a "MAC verification error" means that there is a Byzantine fault. However, since transactions are not executed in the ordering phase, a MAC verification error at this point means that, although there is a Byzantine fault, there is no divergence between the primary database 154P and the secondary database 154S.

When an error is not detected in S504 (S505: Yes), the secondary server 155S writes the transaction request received in S503 in a database for transaction requests (S506). Each transaction request has a nonce (transaction ID), the database includes a record with a nonce as a primary key, and the transaction request itself (or a parameter included in the transaction request) is written to the record. When a transaction request with the identical nonce has already been written, the secondary server 155S aborts a transaction in accordance with the transaction request received in S503.

After S506, the secondary server 155S simulates an execution of the function designated by the transaction request received in S503 and identifies what records are to be read and what records are to be written by the function or, in other words, identifies a read set (one or more records to be read) and a write set (one or more records to be written). In the simulation, the function is executed without writing a record in the secondary database 154S. In other words, the simulation is equivalent to a tentative execution of the transaction request.

After a read set and a write set are identified, the secondary server 155S tries to get a read lock for each record in the read set and get a write lock for each record in the write set (S508). Specifically, the secondary server 155S tries the following.

For each record in the read set, the secondary server 155S identifies a lock entry 300 from the primary key of the record. When the lock type 303 in the identified lock entry 300 is "no lock" or a "read lock", acquisition of a read lock succeeds (when the lock type 303 is "no lock", the secondary server 155S updates the lock type 303 to a "read lock"). When the acquisition of a read lock succeeds, the secondary server 155S increments a value of the lock count 304 by 1, adds the ID (Nonce) of the transaction to the lock holder 305, and updates the latest update time 307.

For each record in the write set, the secondary server 155S identifies a lock entry 300 from the primary key of the record. When the lock type 303 in the identified lock entry 300 is "no lock", acquisition of a write lock succeeds. When the acquisition of a write lock succeeds, the secondary server 155S updates the lock type 303 to a "write lock", sets the lock count 304 to "1", registers the ID (Nonce) of the transaction in the lock holder 305, registers in the input 306 the ID and the version of each of all records (one or more records in the read set) having been read to create the record, and updates the latest update time 307.

Once a lock has been acquired for all records in the read set and the write set (S509: Yes), the secondary server 155S uses the $\text{secret}_{PrimarySecondary}$ to create a MAC (hereinafter, a $\text{MAC}_{Secondary}$) with respect to the transaction ID (S510), sets the created $\text{MAC}_{Secondary}$ to a response (S511), and returns the response to the client 102 (S515).

When a lock has not been acquired with respect to at least one record (S509: No), recovery processing (refer to FIGS. 8 to 13) is performed (S512). Subsequently, the secondary server 155S releases all of the locks acquired in S508 with respect to the transaction request received in S503 (S513). In addition, the secondary server 155S sets an error to a response (S514) and returns the response to the client 102 (S515). When ordering validation (FIG. 12) is performed in the recovery processing, the following may be adopted.

When S1206, S1209, or S1211 to be described later is performed in the ordering validation (FIG. 12), S514 is skipped and S515 is performed. In other words, the response to be returned to the client 102 may be a response to which an error has been set in the ordering validation.

When S1212 to be described later is performed in the ordering validation (FIG. 12), S514 is performed. In other words, OK set to a response in the ordering validation is replaced with an error.

In S511, S514, and S516, the transaction ID included in the transaction request received in S503 may be set to a response.

The client 102 receives the response transmitted in S515 or S517 (S518). When an error is set to the response (S519: No), the client 102 identifies the error and returns the error to the application 101 (S520). When an error is not set to the response (S519: Yes), with respect to the transaction request created in S501, the ordering phase ends and the commit phase is started.

The important point of the ordering phase described above is that a presence or absence of conflicts in transaction requests is determined and the transaction requests are ordered into a partial order in advance based on a determination result thereof. Without the ordering phase, conflicting transaction requests may cause nondeterministic results. As a result, the state of the primary database 154P and the state of the secondary database 154S are to diverge even when a Byzantine fault does not occur.

When determining a presence or absence of conflicts in transaction requests, a lock method based on 2-phase locking (2PL) is used with respect to each record in the read set and the write set. Strict serializability in the database system 130 is guaranteed using the 2PL-based lock method for transaction ordering.

All of the processing in the ordering phase are executed in parallel. The acquisition of a lock with respect to all records in the read set and the write set in the ordering phase means that there are no conflicting transactions. The transactions are executed in parallel by the primary server 155P in the commit phase and executed in parallel by the secondary server 155S in the subsequent validation phase.

On the other hand, a failure to acquire a lock with respect to at least one record in the read set and the write set means that there are conflicting transactions. In this case, the secondary server 155S aborts the transaction and releases all of the locks acquired with respect to the transaction request. The reason for aborting the transaction instead of waiting for locks to be released is that the secondary server 155S needs to re-execute the simulation (S507) to get the latest versions of records to order transactions in a strict serializable manner.

Figure 6:
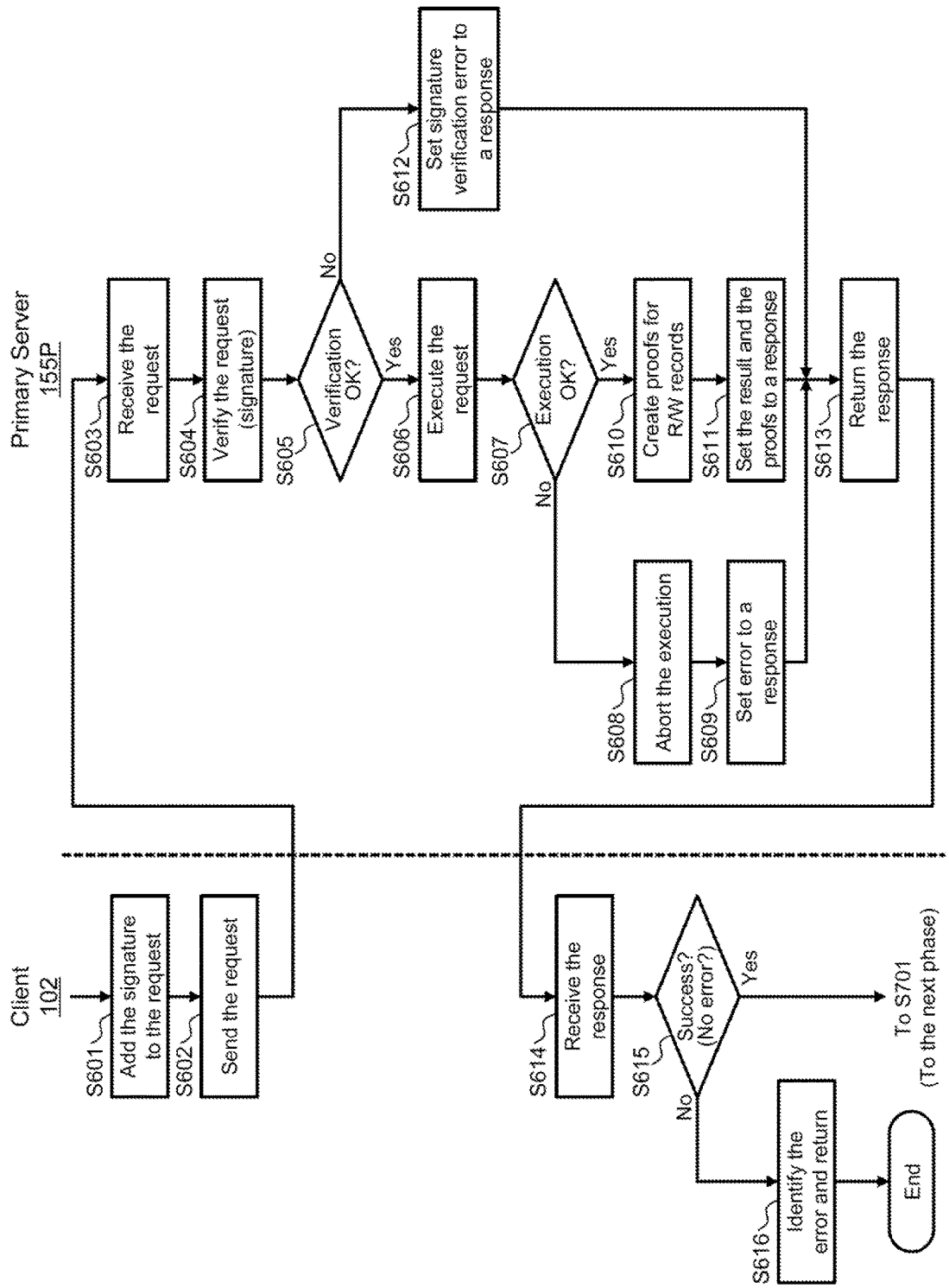
FIG. 6 shows an example of a flow of processing in a commit phase.

FIG. 6 shows an example of a flow of processing in the commit phase.

The commit phase starts when the client 102 receives an acknowledgment (a response to which an error is not set but a $\text{MAC}_{Secondary}$ is set) from the secondary server 155S. The client 102 first adds the $\text{MAC}_{Secondary}$ set to the acknowledgment from the secondary server 155S to a transaction request corresponding to the acknowledgment from the secondary server 155S (the transaction request created in S501) (S601). The client 102 transmits the transaction request to the primary server 155P (S602).

The primary server 155P receives the transaction request (S603). The primary server 155P verifies the $\text{MAC}_{client}$ in the transaction request using the $\text{secret}_{ClientServer}$ and verifies the $\text{MAC}_{Secondary}$ in the transaction request using the $\text{secret}_{PrimarySecondary}$ (S604). When an error is detected in the verification of at least one MAC (S605: No), the primary server 155P sets a MAC verification error to a response (S612) and returns the response to the client 102 (S613). Note that the MAC verification error at this point means that, although there is a Byzantine fault, there is no divergence between the primary database 154P and the secondary database 154S. This is because a transaction is not executed (S606 is not performed) by the primary server 155P.

When an error is not detected in the verification of any of the MACs (S605: Yes), the primary server 155P executes a transaction in accordance with the transaction request received in S603 (S606). Specifically, the primary server 155P refers to a function designated by the transaction request and atomically reads records from the primary database 154P and/or writes records in the primary database 154P and writes the transaction request received in S603 in the database for transaction requests. A version of the record to be written is a version subsequent to a version of a record prior to write with the same primary key as the record to be written. A transaction status of the transaction request to be written is "Committed" or "Aborted".

When the execution of S606 fails (S607: No), the primary server 155P aborts the transaction (S608), sets an error to a response (S609), and returns the response to the client 102 (S613).

When the execution of S606 succeeds (S607: Yes), the primary server 155P creates a proof (refer to FIG. 4) for each written record and for each read record (S610). Hereinafter, a proof created by the primary server 155P will be referred to as a "primary proof" for the sake of convenience. A primary proof is an example of the first proof and the input 404 with respect to a primary proof is an example of the first input. The signature 405 included in a primary proof is a MAC (hereinafter, a $MAC_{Primary}$) created by the primary server 155P using the $secret_{PrimarySecondary}$. The primary server 155P sets the primary proof and a result of the execution of the transaction to a response (S611) and returns the response to the client 102 (S613). A result set to a response by the primary server 155P will be referred to as a "primary result" for the sake of convenience. A primary result is an example of the first result.

In S609, S611, and S612, the transaction ID included in the transaction request received in S603 may be set to a response.

The client 102 receives a response (an example of the first response) from the primary server 155P (S614). When an error is set to the response (S615: No), the client 102 identifies the error and returns the error to the application 101 (S616). When an error is not set to the response (S615: Yes), with respect to the transaction request created in S501, the commit phase ends and the validation phase is started.

In the commit phase, the primary server 155P may immediately execute a transaction request upon receiving the transaction request or execute the transaction request in an arbitrary order. Specifically, the primary server 155P may execute the received transaction request at an arbitrary timing without determining a presence or absence of conflicts with respect to the received transaction request (without acquiring locks with respect to records to be read or written). This is because received transaction requests have already been ordered into a partial order while guaranteeing strict serializability by the secondary server 155S. As a result, the primary server 155P can execute non-conflicting transaction requests in parallel.

Figure 7:
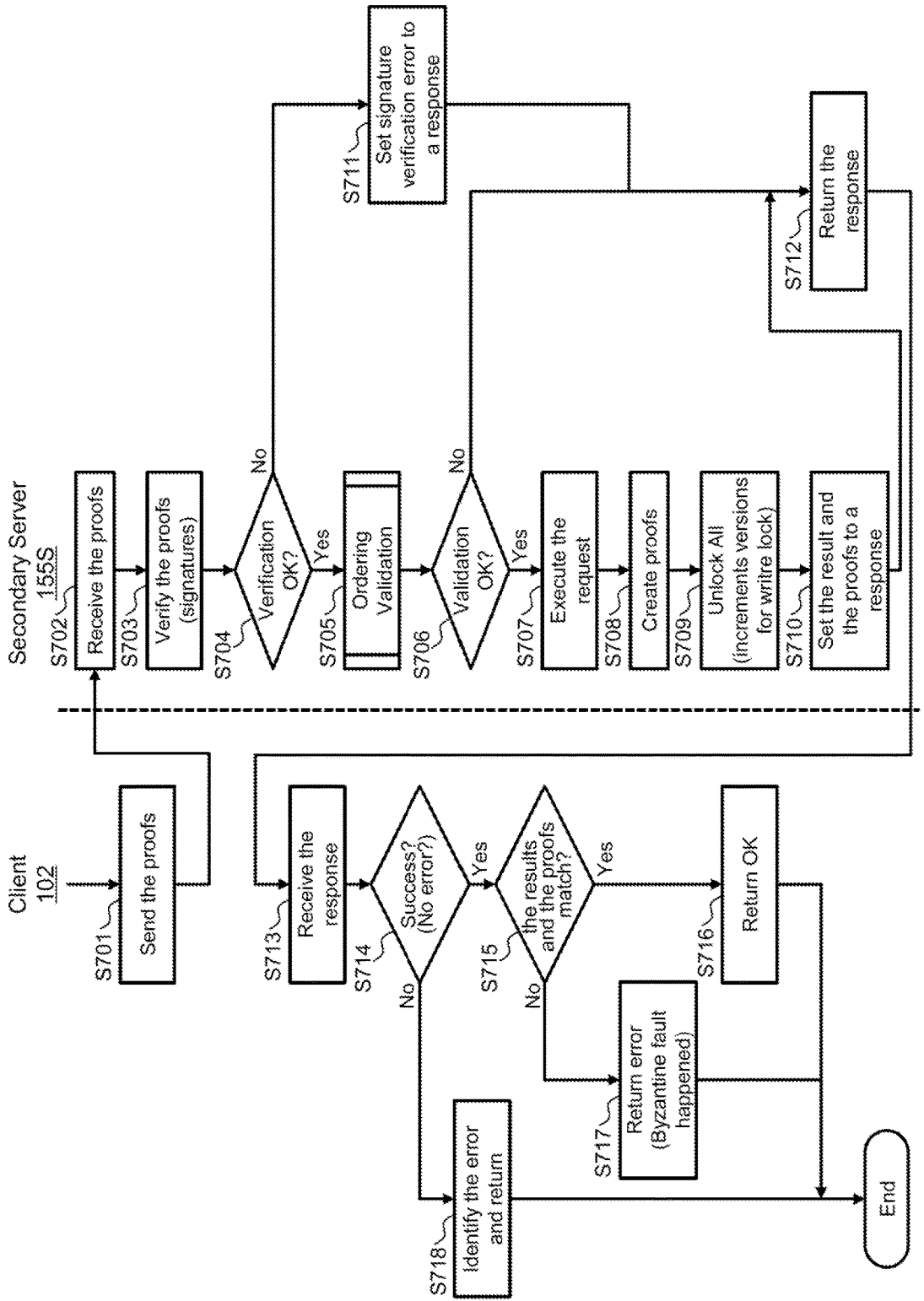
FIG. 7 shows an example of a flow of processing in a validation phase.

FIG. 7 shows an example of a flow of processing in the validation phase.

The validation phase starts when the client 102 receives an acknowledgment (a response to which an error is not set) from the primary server 155P.

Before returning a response to the application 101, the client 102 transmits all primary proofs within the received acknowledgment to the secondary server 155S (S701).

The secondary server 155S receives primary proofs from the client 102 (S702). With respect to each primary proof, the secondary server 155S verifies the signature 405 (MAC) in the primary server 155P using the $secret_{PrimarySecondary}$ in order to check whether or not the primary proof has been created by the primary server 155P (S703). When an error is detected in the verification of the signature 405 (MAC) of any of the primary proofs (S704: No), the secondary server 155S sets a MAC verification error to a response (S711) and returns the response to the client 102 (S712). The MAC verification error at this point means that there is a Byzantine fault and there may be a divergence between the primary database 154P and the secondary database 154S. This is because a transaction has been committed in the primary server 155P (there is a possibility that a record is being written in the primary database 154P).

When an error is not detected in the verification of the signature 405 (MAC) of any of the primary proofs (S704: Yes), the secondary server 155S performs an ordering validation (S705).

Figure 12:
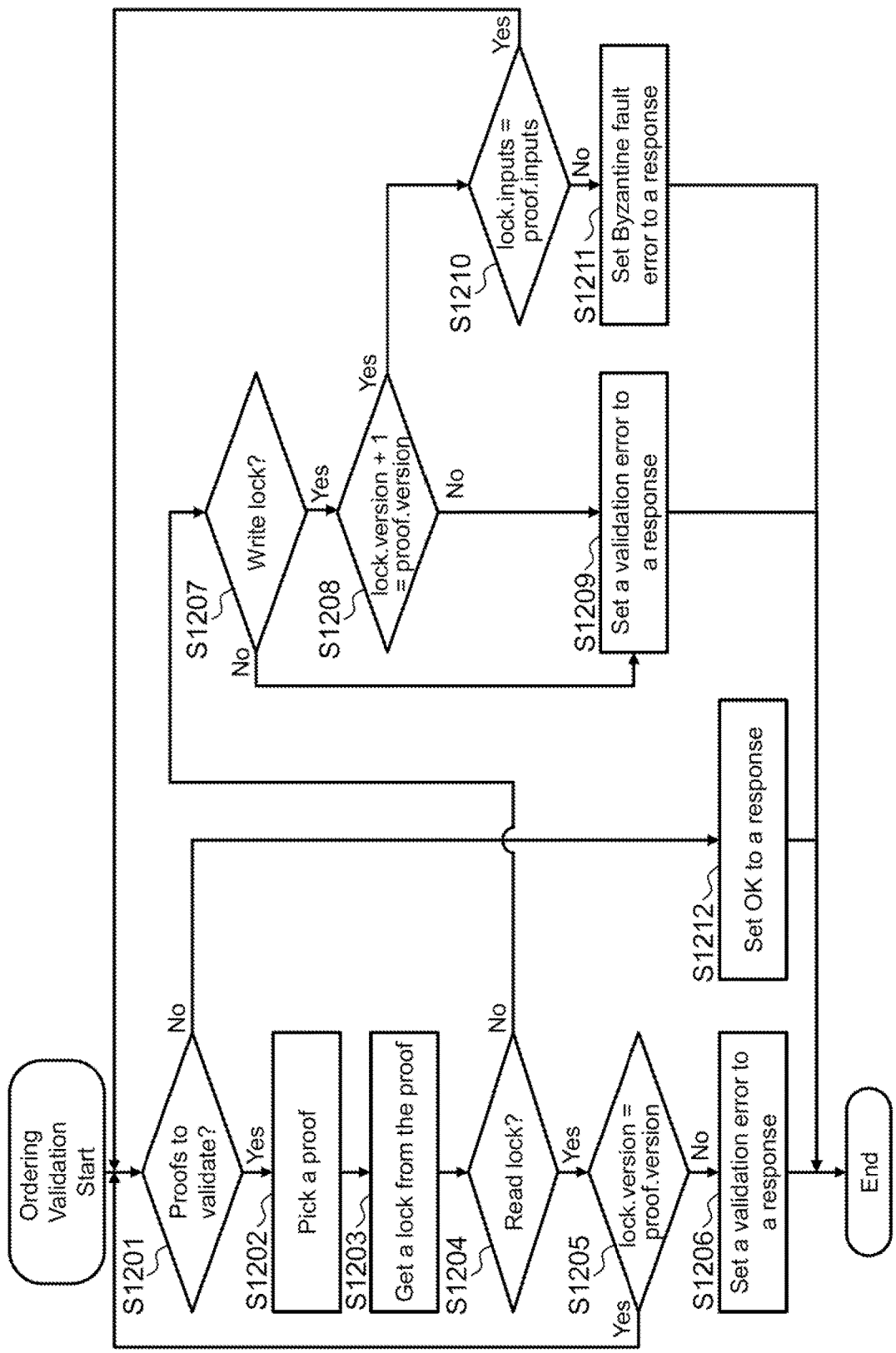
FIG. 12 shows an example of a flow of an ordering validation.

In the ordering validation, as shown in FIG. 12, a primary proof and the lock entry 300 identified from the primary proof are compared in order to confirm that ordering in the primary system 150P and the secondary system 150S is the same. Specifically, for each primary proof, the secondary server 155S compares versions and inputs between the primary proof and the lock entry 300 with a same primary key as the primary proof and checks whether or not the versions and inputs match. While errors such as a missing lock entry or mismatched versions may occur due to the recovery processing performed in S512, such errors can be detected in the ordering validation. The ordering validation is pre-validation and the final validation is delegated to the client 102. This is because when the secondary system 150S is malicious, there is a possibility that the ordering validation will be skipped.

Performing, with respect to each primary proof, a comparison between the primary proof and a lock entry 300 (the lock entry 300 specified from a primary key included in the primary proof) is equivalent to comparing the ordering in the secondary system 150S with the ordering in the primary system 150P. The reason therefor is as follows.

- A primary proof includes the input 404 being a set of IDs and versions of all records used to create a record corresponding to the proof. In a similar manner, the lock entry 300 also includes the input 306 being a set of IDs and versions of all records used to create a record corresponding to the lock entry 300.
- Therefore, the primary proof and the lock entry 300 both represent a dependence relationship among records in a transaction. In other words, both represent a dependence relationship among transactions.
- The dependence relationship among transactions being the same means that transactions are arranged in a same partial order.
- Due to the above, performing, with respect to each primary proof, a comparison between the primary proof and the lock entry 300 is equivalent to comparing the ordering in the secondary system 150S with the ordering in the primary system 150P. Since the partial order of transactions is the same between the primary system 150P and the secondary system 150S, a same result is derived.

When a validation error or a Byzantine fault error is set to a response in the ordering validation (S706: No), the secondary server 155S returns the response to the client 102 (S712).

When OK (data signifying a successful validation) is set to a response in the ordering validation (S706: Yes), the secondary server 155S executes a transaction in accordance with the transaction request received in S503 (a transaction request specified from the database for transaction requests using the transaction ID received in S702 as a key) (S707).

When the transaction execution in S707 is successful, the secondary server 155S creates a proof for each record read and/or written in S707 (S708). Hereinafter, a proof created by the secondary server 155S will be referred to as a "secondary proof" for the sake of convenience. A secondary proof is an example of the second proof and the input 404 in a secondary proof is an example of the second input. The signature 405 included in a secondary proof is a MAC ($MAC_{Secondary}$) created by the secondary server 155S using the secret$_{PrimarySecondary}$.

The secondary server 155S releases a lock for each record read and/or written in S707 (S709). Accordingly, the locks acquired in S508 in the ordering phase are released. When there are records having been written in S707, for each written record, the version 302 of the lock entry 300 is incremented. In addition, in S709, the latest update time 307 is updated for each updated lock entry 300. Furthermore, in S709, the increment of the version 302, the update of the latest update time 307, and the release of the locks are performed atomically. Moreover, in the releasing of locks, with respect to a read lock, a decrement of the lock count 304 and a deletion of the transaction ID from the lock holder 305 are performed but an increment of the version 302 is not performed.

After S709, the secondary server 155S sets the secondary proof and a result (the result of S707) to a response (S710) and returns the response to the client 102 (S712). A result set to a response by the secondary server 155S will be referred to as a "secondary result" for the sake of convenience. A secondary result is an example of the second result.

The client 102 receives a response (an example of the second response) from the secondary server 155S (S713). When an error is set to the response (S714: No), the client 102 identifies the error and returns the error to the application 101 (S718).

When an error is not set to the response (S714: Yes), the client 102 compares the primary result and the secondary result with each other and, at the same time, compares all primary proofs and all secondary proofs with each other (S715). When the same transaction is executed by the primary server 155P and the secondary server 155S, all primary proofs and all secondary proofs should match. This is because the same decision function is executed by the primary server 155P and the secondary server 155S and, therefore, the same records should be read and the same records should be written.

When the primary result and the secondary result match each other and, at the same time, all primary proofs and all secondary proofs match each other (S715: Yes), the client 102 returns OK (data which represents an ID of a transaction and which represents that the transaction has succeeded) to the application 101 (S716).

When the primary result and the secondary result do not match each other or when at least one proof does not have a matching proof (S715: No), the client 102 returns data representing the presence of a Byzantine fault in any of the primary system 150P and the secondary system 150S to the application 101 (S717).

This concludes the description of the Byzantine fault detection protocol.

In the Byzantine fault detection protocol, 2PL-based ordering is adopted. Therefore, strict serializability in the database system 130 can be guaranteed. As a comparative example, while MVCC (MultiVersion Concurrency Control) can conceivably be used for ordering, with MVCC, it is difficult to guarantee consistent ordering between the secondary system 150S and the primary system 150P. A specific example is as follows. Let us assume that conflicting transactions T1 and T2 arrive at the database system 130 at more or less the same time and are ordered together using MVCC. Let us also assume that both transactions pass through the ordering phase in a serialization order T1→T2. However, the serialization order T1→T2 is not guaranteed in the primary system 150P. This is because the secondary system 150S does not hand over explicit order dependencies such as a conflict graph to the primary system 150P and, consequently, the primary system 150P may order transactions in a different serialization order (for example, T2→T1) from the secondary system 150S.

Since the Byzantine fault detection protocol is constituted of the three phases (ordering→commit→validation) described above, the database system 130 can achieve concurrent execution while guaranteeing strict serializability.

In addition, according to the Byzantine fault detection protocol, the secondary system 150S starts before the primary system 150P and the primary server 155P performs processing of the commit phase. While a state of a transaction is determined in the processing of the commit phase, the determination of the state of the transaction is preferably performed by the primary system 150P instead of the secondary system 150S. However, as a modification, the primary system 150P may start first. In other words, the primary server 155P may perform the processing of the ordering phase and the processing of the validation phase and the secondary server 155S may perform the processing of the commit phase.

According to the Byzantine fault detection protocol, when a lock is already acquired in the ordering phase and the acquired lock should be released, recovery processing for releasing the lock is performed (S512). For example, when a crash fault such as a node crash or a network failure occurs in the secondary system 150S, an acquired lock may be left behind (without being released). The recovery processing enables such locks to be released.

Figure 8:
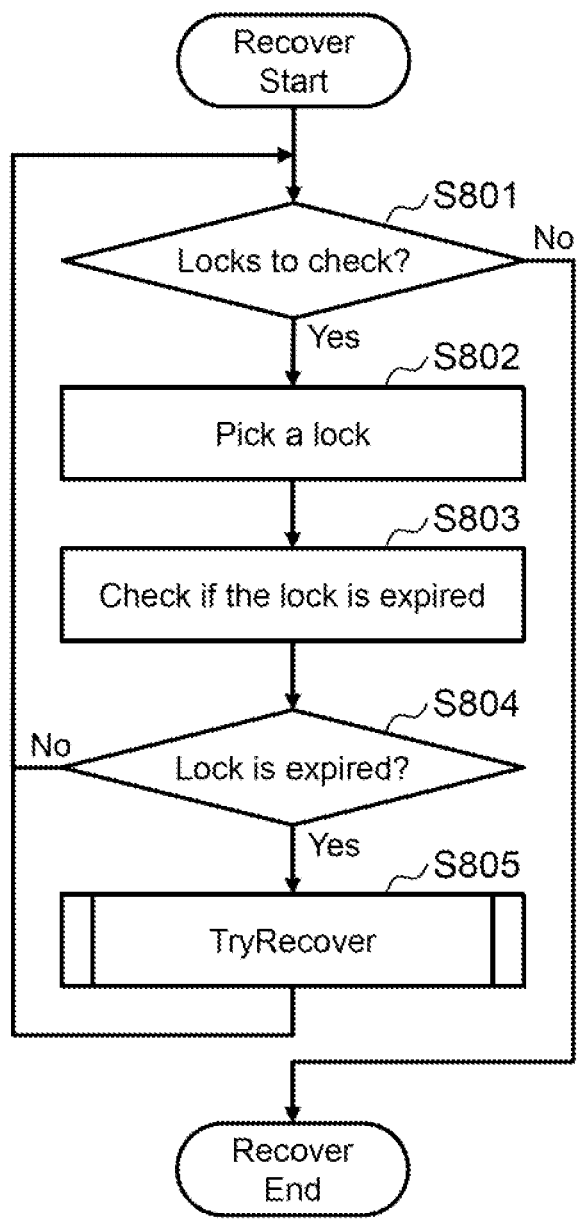
FIG. 8 shows an example of a flow of recovery processing.

FIG. 8 shows an example of a flow of the recovery processing.

When there are locks to be checked (S801: Yes), the secondary server 155S extracts one lock from the locks (S802). The "locks to be checked" in this case are locks with respect to records of which locks have not been acquired among a read set and a write set and are locks not yet extracted in S802.

The secondary server 155S determines whether or not the extracted lock is expired (S803). The determination is a determination of whether or not a certain period of time has elapsed from the latest update time 307 in the lock entry 300 of the lock. When the lock is not expired (S804: No), with respect to records for which the lock has been acquired, the recovery processing ends without releasing the lock and the transaction is aborted.

When the lock is expired (S804: Yes), try recovery processing of the lock is performed (S805).

Figure 9:
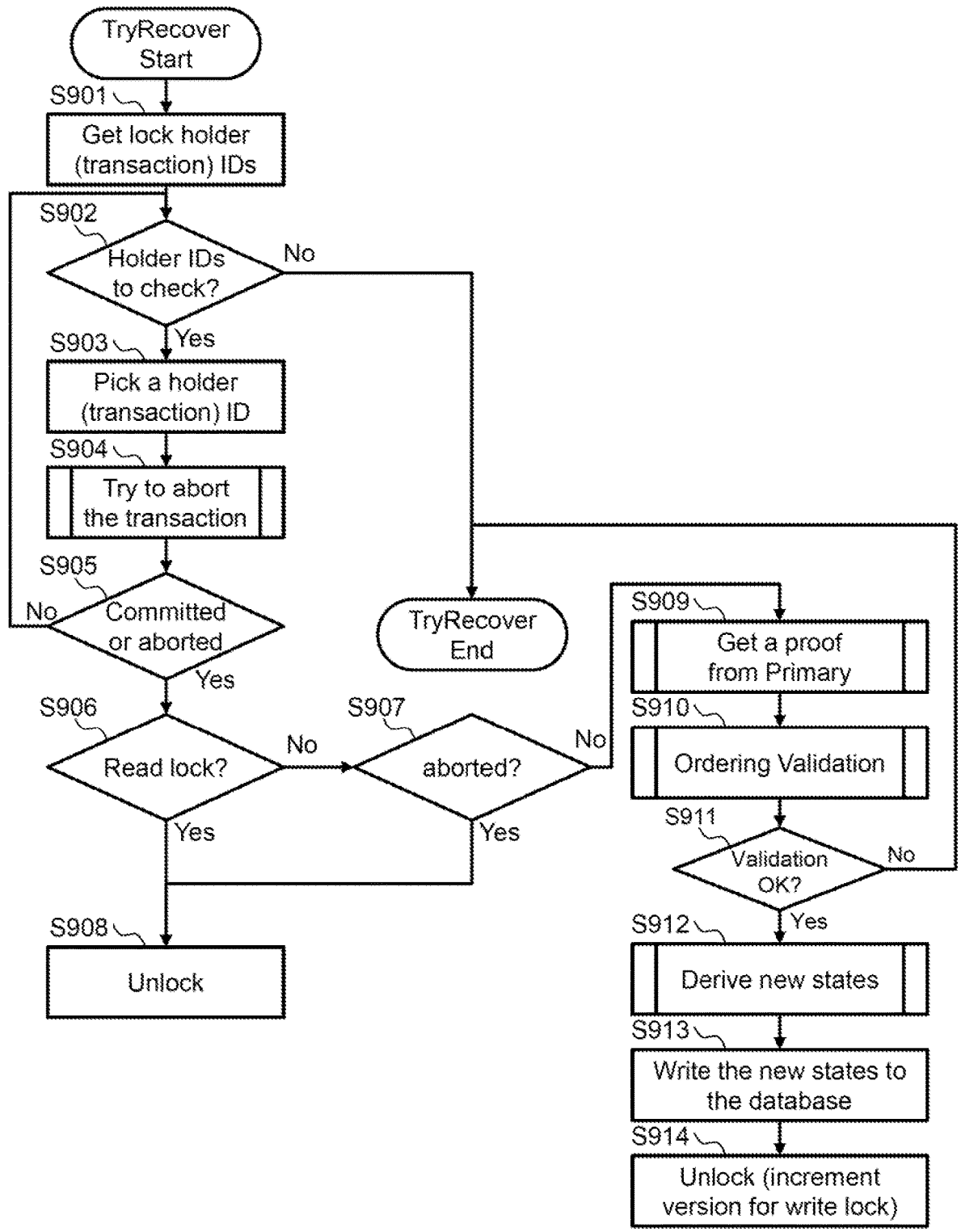
FIG. 9 shows an example of a flow of try recovery processing.

FIG. 9 shows an example of a flow of try recovery processing.

The secondary server 155S gets the lock holder 305 (a set of transaction IDs) of the lock (S901). When there are transaction IDs to be checked (S902: Yes), the secondary server 155S extracts one transaction ID from the transaction IDs (S903). The "transaction IDs to be checked" in this case are transaction IDs not yet extracted in S903 among the transaction IDs acquired in S901.

Figure 10:
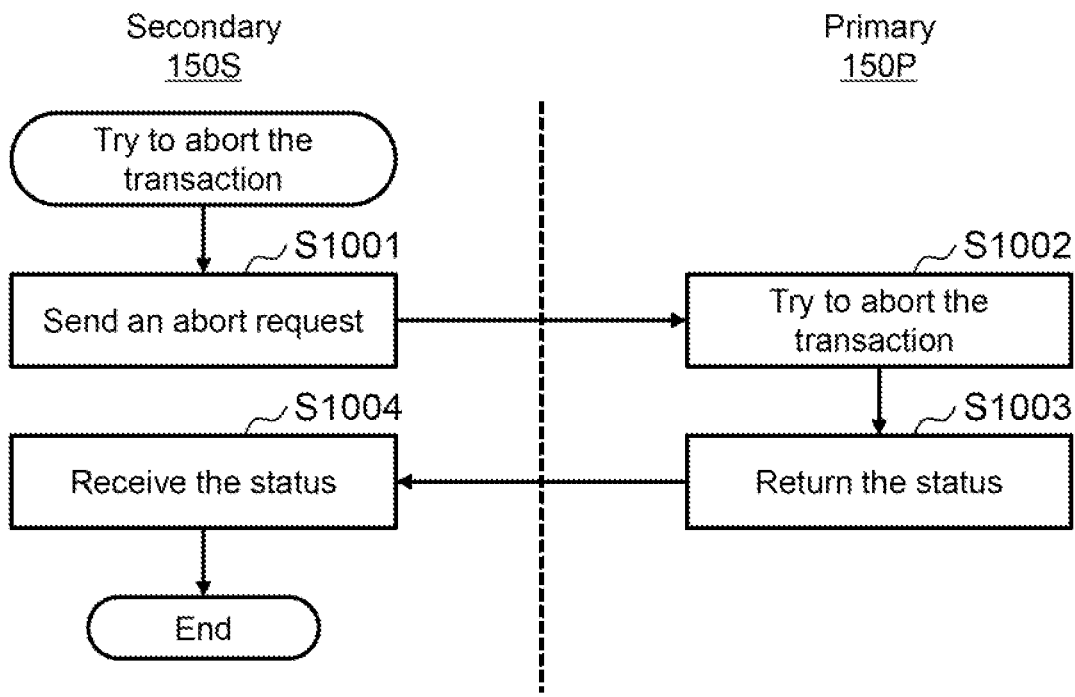
FIG. 10 shows an example of a flow of try abort processing.

The secondary server 155S starts try abort processing for specifying a status of the transaction ID extracted in S903 (S904). In other words, as shown in FIG. 10, the secondary server 155S transmits an abort request designating the transaction ID to the primary server 155P (S1001). The primary server 155P receives the abort request, tries to abort a transaction with the transaction ID designated in the abort request (S1002), and returns a status of the transaction to the secondary server 155S (S1003). When the transaction is not yet committed, the primary server 155P succeeds in aborting the transaction and returns a status "Aborted" meaning the transaction is already aborted. When the transaction is already committed, the primary server 155P fails to abort the transaction and returns a status "Committed" meaning the transaction is already committed. When the transaction is not yet committed but the primary server 155P fails to abort the transaction (for example, when failing to abort the transaction due to the secondary server 155S being in a busy state), a predetermined status "Unknown" is returned. The secondary server 155S receives a status of a transaction with the transaction ID designated by the abort request (S1004). Communication between the secondary server 155S and the primary server 155P illustrated in FIG. 10 may be performed via the client 102 (typically, a client having requested a transaction with the transaction ID) or may be performed without involving the client 102. In addition, instead of the abort request, the secondary server 155S may transmit a status acquisition request designating the transaction ID to the primary server 155P and transmit an abort request to the primary server 155P in accordance with a status transmitted from the primary server 155P as a response to the status acquisition request.

When the status in the response from the primary server 155P is "Unknown" (S905: No), the secondary server 155S skips recovery with respect to the ID acquired in S903 and checks another transaction ID (S902). When a record for which a lock has already been acquired becomes a read record or a write record of another transaction, since the record once again becomes a target of recovery processing, skipping recovery will not pose an issue.

When the status in the response from the primary server 155P is "Committed" or "Aborted" (S905: Yes), the secondary server 155S recovers the lock with respect to the transaction.

When the lock type 303 is a "read lock" (S906: Yes), the secondary server 155S releases the lock with respect to the transaction (S908). Specifically, the secondary server 155S deletes the ID of the transaction from the lock holder 305 and decrements the lock count 304.

When the lock type 303 is a "write lock" (S906: No) and the status is "Aborted" (S907: Yes), the secondary server 155S releases the lock without incrementing the version 302 of the lock entry 300 (S908). Specifically, the secondary server 155S deletes the transaction ID from the lock holder 305 (in other words, empties the lock holder 305) and decrements the lock count 304 (sets the lock count 304 to "0").

Figure 11:
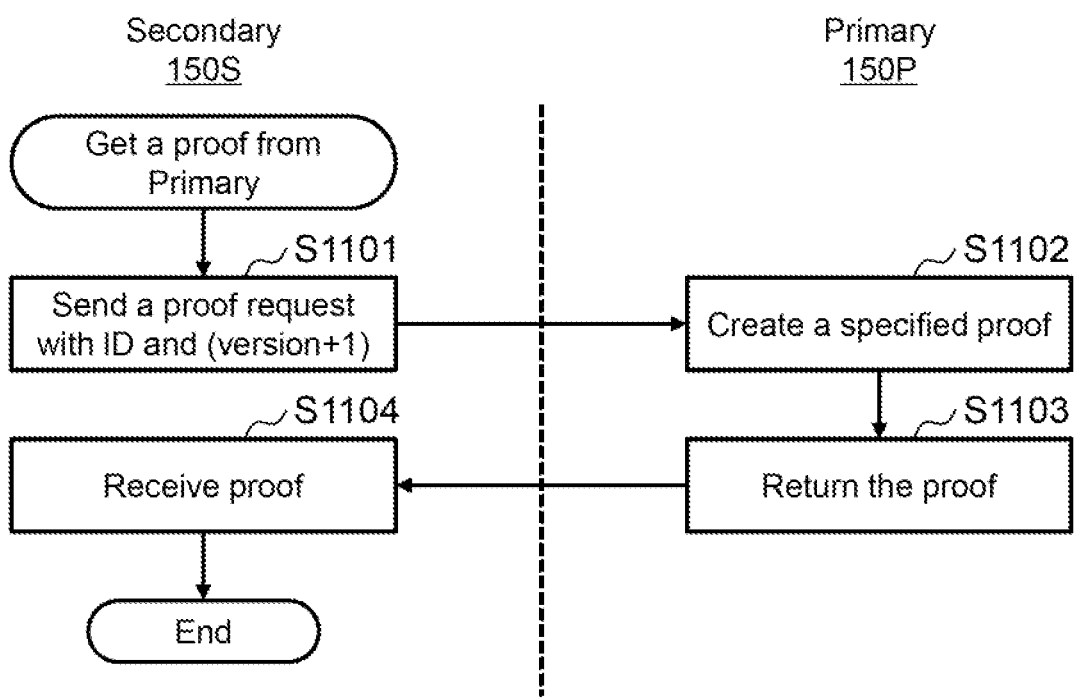
FIG. 11 shows an example of a flow of proof acquisition processing.

When the lock type 303 is a "write lock" (S906: No) and the status is "Committed" (S907: No), the secondary server 155S starts the proof acquisition processing (S909). In other words, as shown in FIG. 11, the secondary server 155S transmits a proof request to the primary server 155P in order to get a primary proof of the record corresponding to the lock (S1101). In the proof request, the record ID (primary key) of the lock entry 300 and a subsequent version to the version 302 of the lock entry 300 are designated. The primary server 155P receives the proof request and creates a primary proof with respect to a record with the record ID and the version designated in the proof request (S1102). Specifically, the primary server 155P specifies a transaction ID and an input from a record corresponding to the record ID and the version designated in the proof request. The primary server 155P generates a MAC based on the record ID and the version designated in the proof request and the specified transaction ID and the specified input. The primary server 155P creates a primary proof including the record ID, the version, the transaction ID, the input, and the MAC. The primary server 155P returns the primary proof to the secondary server 155S (S1103). The secondary server 155S receives the primary proof as a response to the proof request transmitted in S1101 (S1104).

The secondary server 155S performs the ordering validation (FIG. 12) with respect to the received primary proof (S910). When OK is set to a response in the ordering validation (S911: Yes), the secondary server 155S performs new state derivation processing (refer to FIG. 13) of deriving a new state of a record corresponding to the validated primary proof (S912). The secondary server 155S writes a record representing the state in the secondary database 154S (S913) and releases the lock (S914). Since a record representing a new state is to be written, the secondary server 155S increments the version 302 of the lock entry 300 when releasing the lock. When an error is detected in the ordering validation (S911: No), the try recovery processing is ended.

The recovery processing for each record is idempotent so that the recovery processing can be retried. Even if multiple processes of the secondary server 155S perform recovery processing at the same time, only one process releases a lock in a linearizable manner.

In addition, the secondary server 155S does not release a lock unless an agreement with the primary server 155P is in place. Specifically, the secondary server 155S gets a primary proof of a write-locked record from the primary server 155P and releases the lock when an ordering validation of the primary proof is performed.

FIG. 12 shows an example of a flow of the ordering validation.

When there are primary proofs to be validated (S1201: Yes), the secondary server 155S extracts one primary proof from the primary proofs (S1202). The "primary proofs to be checked" in this case are primary proofs not yet extracted in S1202 among the primary proofs received from the client 102 or the primary server 155P. In addition, as described earlier, there is one primary proof for each record. For example, when two records A and B are to be read and two records C and D are to be written, there are four primary proofs. When the two records A and B are to be read and the two records A and B are to be written, there are two primary proofs.

The secondary server 155S gets the lock entry 300 corresponding to the extracted primary proof (S1203). Specifically, the secondary server 155S gets the lock entry 300 with the same record ID as the record ID of the primary proof.

When the lock type 303 of the lock entry 300 is a "read lock" (S1204: Yes), the secondary server 155S determines whether or not the version 402 of the primary proof and the version 302 of the lock entry 300 match each other (S1205). When the versions match each other (S1205: Yes), the processing returns to S1201. When the versions do not match each other (S1205: No), the secondary server 155S sets a validation error to a response (S1206). Note that a "validation error" is an error which differs from a "MAC verification error" and which signifies a possibility of the error being a Byzantine fault (but a Byzantine fault is not necessarily present). When the client 105 receives a response to which a validation error is set, the client 102 desirably reads records which have possibly been tampered in order to check whether the records have been tampered due to a Byzantine fault.

When the lock type 303 of the lock entry 300 is not a "read lock" (S1204: No), the secondary server 155S determines whether or not the lock type 303 is a "write lock" (S1207). When the lock type 303 is not a "write lock" (S1207: No) due to, for example, tampers of the lock type 303, the secondary server 155S sets a validation error to a response (S1209).

When the lock type 303 is a "write lock" (S1207: Yes), the secondary server 155S determines whether or not a value after incrementing the version 302 of the lock entry 300 by 1 and the version 402 of the primary proof match each other (S1208). When the versions do not match each other (S1208: No), the secondary server 155S sets a validation error to a response (S1209).

When the versions match each other (S1208: Yes), the secondary server 155S determines whether or not the input 306 of the lock entry 300 and the input 404 of the primary proof match each other (S1210). When the inputs do not match each other (S1210: No), the secondary server 155S sets a Byzantine fault error to a response (S1211). When the inputs match each other (S1210: Yes), the processing returns to S1201.

When there are no primary proofs to be validated (S1201: No) or, in other words, when an error is not detected with respect to all primary proofs, the secondary server 155S sets OK to a response (S1212).

Figure 13:
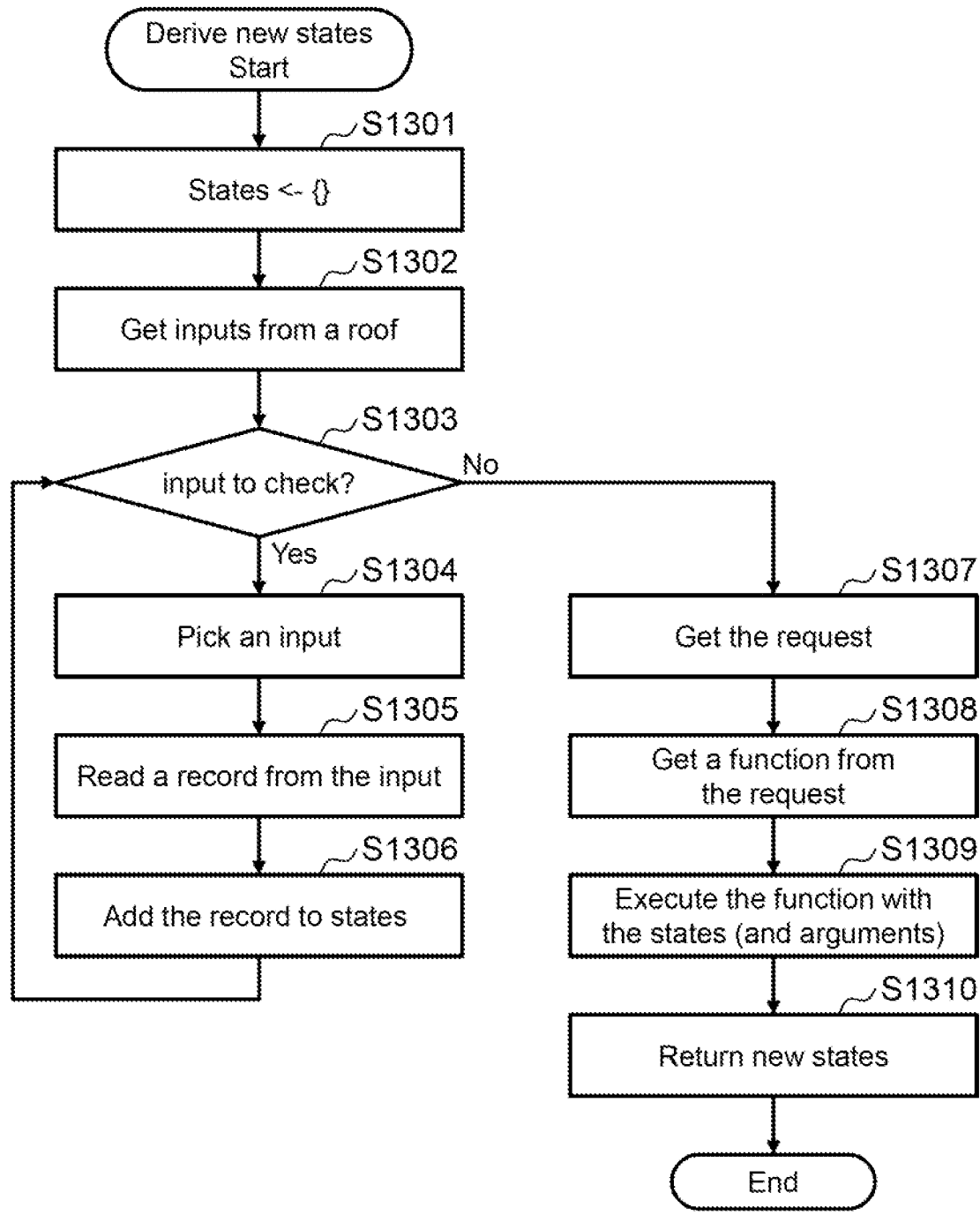
FIG. 13 shows an example of a flow of new state derivation processing.

FIG. 13 shows an example of a flow of new state derivation processing.

The secondary server 155S sets an empty value as States (S1301). The secondary server 155S gets the input 404 or, specifically, one or a plurality of input values from a primary proof (S1302).

When there are input values to be checked (S1303: Yes), the secondary server 155S extracts one input value from the input values (S1304). The "input values to be checked" in this case are input values not yet extracted in S1304 among the input values acquired in S1302.

The secondary server 155S reads a record corresponding to the extracted input value from the database 154S (S1305) and adds the read record to States (S1306).

When there is no input value to be checked (S1303: No), the secondary server 155S gets a transaction request from the database for transaction requests using a transaction ID included in the primary proof acquired in S909 as a key (S1307). The secondary server 155S gets a function designated by the acquired transaction request (S1308). The secondary server 155S executes the function using States (S1309). Accordingly, a new state (States) is obtained. The secondary server 155S returns the obtained new state (S1310).

While an embodiment has been described above, the embodiment is merely an example for describing the present invention and is not intended to limit the scope of the present invention thereto. The present invention can also be implemented in various other modes.

For example, execution of a same decision function with respect to identical transaction requests by the primary server 155P and the secondary server 155S may be realized by a method other than installing a same set of the decision function in the primary server 155P and the secondary server 155S in advance. For example, the client 102 may transmit a decision function together with a transaction request to the primary server 155P and the secondary server 155S every time the client 102 transmits a transaction request, and the primary server 155P and the secondary server 155S may respectively execute the received decision function together with the transaction request. In addition, a transaction request may be an SQL statement.

Furthermore, for example, ordering to a partial order in a strict serializable manner may be realized using a method other than the 2PL-based locking method described earlier.

In addition, according to the embodiment described above, for each transaction request, in the ordering phase, the secondary server 155S orders the transaction request from the client 102 into a strict serializable partial order. Specifically, for each transaction request, the secondary server 155S determines a presence or absence of a conflict of transactions by tentatively executing a transaction in accordance with the transaction request from the client and returns a predetermined response to the client when it is determined that there is no conflict.

REFERENCE SIGNS LIST

130 Database system

The invention claimed is:

1. A data management system which comprises first and second computer systems, comprising:
    a client which transmits a transaction request, which is a request for a transaction to read or write an object representing a state of a target; and
    first and second servers, which execute a same decision function with respect to identical transaction requests, wherein
    the first computer system manages a first object group set, wherein the first object group set comprises a first object group for each target, wherein each first object group comprises one or more first objects, and wherein each first object represents a state of a target,
    the second computer system manages a second object group set, wherein the second object group set comprises a second object group for each target, wherein each second object group comprises one or more second objects, and wherein each second object represents a state of a target,
    the first server is provided in the first computer system,
    the second server is provided in the second computer system,
    there are an ordering phase, a commit phase, and a validation phase,
    for each transaction request,
    in the ordering phase,
        the client transmits the transaction request to the second server, and
        the second server orders the transaction request from the client into a strict serializable partial order,
    in the commit phase,
        the client transmits the transaction request to the first server, and
        the first server executes a transaction in accordance with the transaction request from the client in the partial order determined in the ordering phase and returns to the client a first response to the transaction request, and
    in the validation phase,
        the second server executes a transaction in accordance with the transaction request from the client in the partial order determined in the ordering phase and returns to the client a second response to the transaction request, and
        the client detects a Byzantine fault based on a result of a comparison between the second response and the first response.

2. The data management system according to claim 1, wherein
in the ordering phase,
the second server determines a presence or absence of a conflict of a transaction in accordance with the transaction request from the client by tentatively executing the transaction and returns to the client a predetermined response when determination is made that there is no conflict,
in the commit phase,
the client having received the predetermined response transmits the transaction request to the first server, and
the first server executes a transaction in accordance with the transaction request from the client, creates a first proof with respect to each of one or more first objects having been read or written in the transaction, and returns to the client a first response including a first result, which is an execution result of the transaction, and the one or more created first proofs, and
in the validation phase,
the second server executes a transaction in accordance with the transaction request, creates a second proof with respect to each of one or more second objects having been read or written in the transaction, and returns to the client a second response including a second result, which is an execution result of the transaction, and the one or more created second proofs, and
the client determines whether or not the one or more first proofs included in the first response and the one or more second proofs included in the second response match each other and determines whether or not the first result included in the first response and the second result included in the second response match each other, and detects a Byzantine fault when a result of either determination is false.

3. The data management system according to claim 2, wherein
in the ordering phase, the second server specifies one or more second objects to be read or written by tentatively executing a transaction in accordance with the received transaction request, and returns the predetermined response when a lock has been acquired with respect to each of the one or more specified second objects, and
in the validation phase, the second server releases all locks acquired in the ordering phase with respect to the transaction request when executing a transaction in accordance with the transaction request.

4. The data management system according to claim 3, wherein when a second object remains locked even after a certain amount of time elapses since the second object has been locked,
the second server specifies a transaction by which the lock has been acquired and transmits to the first server a predetermined request that designates an identification (ID) of the specified transaction,
the first server receives the predetermined request and returns a response representing a status of a transaction corresponding to the ID designated in the request, and
the second server receives the response and releases the lock of the second object when the status represented by the response is "aborted".

5. The data management system according to claim 4, wherein when the status represented by the received response is "committed" and a type of the acquired lock is a read lock, the second server releases the lock of the second object.

6. The data management system according to claim 4, wherein when the status represented by the received response is "committed" and a type of the acquired lock is a write lock,
the second server specifies an object ID of the second object and a version of the second object when the lock has been acquired and transmits to the first server a proof request designating the specified object ID and a version subsequent to the specified version,
the first server receives the proof request, specifies a first object with the object ID and the version designated by the proof request, creates a first proof of the specified first object, and returns the first proof,
the first proof includes an object ID and a version of the first object and a first input, which is a set of object IDs and versions of all first objects used to create the first object, and
the second server receives the first proof, creates, using the first proof, a second object in a version subsequent to the second object when the lock has been acquired, writes the created second object in the subsequent version in the second object group set, and releases the lock.

7. The data management system according to claim 6, wherein the second server
performs an ordering validation, which is a validation including a comparison between a version represented by the received first proof and a version of the second object when the lock has been acquired, and
when an error is not detected in the validation, creates and writes the second object in the subsequent version and releases the lock.

8. The data management system according to claim 4, wherein
when a status represented by the received response is neither "aborted" nor "committed",
the second server
does not release the lock, and
when another transaction reads or writes the second object for which the lock has been acquired,
transmits the predetermined request to the first server.

9. The data management system according to claim 2, wherein in the validation phase, the second server receives the one or more first proofs from the client and performs an ordering validation with respect to the one or more first proofs,
the first proof includes an object identification (ID) and a version of the first object corresponding to the first proof and a first input, which is a set of object IDs and versions of a plurality of first objects used to create the first object,
in the ordering validation, when a type of a lock acquired with respect to the second object with a same object ID as the object ID in the first proof is a write lock and a version subsequent to the second object when the lock has been acquired and the version represented by the first proof are the same, the second server
determines whether or not a second input, which is a set of object IDs and versions of all second objects having been read in order to generate a record of a subsequent version with respect to the object ID for which the lock has been acquired, and the first input in the received first proof match each other, and when a result of the determination is false, returns a Byzantine fault error signifying a Byzantine fault to the client.

10. The data management system according to claim 9, wherein in the ordering validation, when an error is not detected with respect to any of the one or more first proofs, the second server executes a transaction in accordance with the transaction request.

11. The data management system according to claim 9, wherein the second server returns to the client a validation error, which is an error signifying that there is a possibility of a Byzantine fault when either of following applies in the ordering validation:
   a type of a lock acquired with respect to the second object with a same object ID as the object ID in the first proof is a read lock and a version of the second object when the lock has been acquired and the version represented by the first proof differ from each other,
   a type of the lock acquired with respect to the second object with a same object ID as the object ID in the first proof is a write lock and a version subsequent to the second object when the lock was acquired and the version represented by the first proof differ from each other.

12. The data management system according to claim 2, wherein
   in the ordering phase,
      the second server verifies whether correct authentication data of the client is included in a transaction request from the client,
      the second server returns the authentication data of the second server to the client,
   in the commit phase,
      the first server verifies whether correct authentication data of each of the client and the second server is included in a transaction request from the client,
      the first server includes the authentication data of the first server in each of the one or more first proofs,
   in the validation phase,
      the second server verifies whether the correct authentication data of the first server is included in each of the one or more first proofs from the client,
   when an error is detected in the verification of authentication data, both the first and second servers return an authentication error to the client,
   an authentication error in the ordering phase or the commit phase is an error which represents a Byzantine fault but represents that there is no divergence between the first and second object group sets, and
   an authentication error in the validation phase is an error which represents a Byzantine fault and represents that there is a divergence between the first and second object group sets.

13. A method for data management, carried out by a data management system which comprises first and second computer systems, the method comprising:
   for each transaction request, which is a request for a transaction to read or write an object representing a state of a target,
   in an ordering phase,
      transmitting by a client the transaction request to a second server, and
      ordering by the second server the transaction request from the client into a strict serializable partial order,
   in a commit phase,
      transmitting by the client the transaction request to a first server, and
      executing by the first server a transaction in accordance with the transaction request from the client in the partial order determined in the ordering phase and returning by the first server to the client a first response to the transaction request, and
   in a validation phase,
      executing by the second server a transaction in accordance with the transaction request from the client in the partial order determined in the ordering phase and returning by the second server to the client a second response to the transaction request, and
      detecting by the client a Byzantine fault, based on a result of a comparison between the second response and the first response,
   the first server being provided in the first computer system,
   the second server being provided in the second computer system,
   the first and second servers being configured to execute a same decision function with respect to identical transaction requests,
   the first computer system managing a first object group set, wherein the first object group set comprises a first object group for each target, wherein each first object group comprises one or more first objects, and wherein each first object represents a state of a target, and
   the second computer system managing a second object group set, wherein the second object group set comprises a second object group for each target, wherein each second object group comprises one or more second objects, and wherein each second object represents a state of a target.

* * * * *